United States Patent
Jiang et al.

(10) Patent No.: US 9,874,958 B2
(45) Date of Patent: Jan. 23, 2018

(54) TOUCH PANEL MODULE

(71) Applicant: TPK TOUCH SOLUTIONS (XIAMEN) INC., Xiamen (CN)

(72) Inventors: Yau-Chen Jiang, Hsinchu (TW); Yanjun Xie, Wuhan (CN); Bin Lai, Fuzhou (CN); Defa Wu, Jinjiang (CN); Yanping Lai, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 145 days.

(21) Appl. No.: 14/667,709

(22) Filed: Mar. 25, 2015

(65) Prior Publication Data

US 2015/0277642 A1 Oct. 1, 2015

(30) Foreign Application Priority Data

Mar. 25, 2014 (CN) .......................... 2014 1 0112140

(51) Int. Cl.
*G06F 3/041* (2006.01)
*G06F 1/16* (2006.01)
*G06F 3/044* (2006.01)

(52) U.S. Cl.
CPC .............. *G06F 3/0412* (2013.01); *G06F 1/16* (2013.01); *G06F 3/044* (2013.01); *G06F 3/0416* (2013.01); *G06F 2203/04102* (2013.01); *G06F 2203/04111* (2013.01)

(58) Field of Classification Search
CPC ...... G06F 3/0412; G06F 3/044; G06F 3/0416; G06F 1/16; G06F 2203/04111; G06F 2203/04102
See application file for complete search history.

(56) References Cited

U.S. PATENT DOCUMENTS

2012/0182258 A1* 7/2012 Kubo .................. G06F 3/03547 345/174
2013/0293489 A1* 11/2013 Shin ....................... G06F 3/041 345/173

* cited by examiner

*Primary Examiner* — Matthew Sim
(74) *Attorney, Agent, or Firm* — Paul David Bendemire

(57) ABSTRACT

For a touch panel module, a first sensing unit is disposed on a viewing area of a substrate and includes a first electrode, a second sensing unit corresponds in position to a non-viewing area of the substrate and includes a first sub-electrode, an attaching portion corresponds in position to the non-viewing area and includes a first contact, and a first conducting wire, two ends of which are respectively connected to the first electrode and the first contact to form an electrical connection therebetween, and a connecting portion corresponds in position to the non-viewing area and includes a first conducting sub-wire for forming electrical connection between the first electrode and the first sub-electrode.

20 Claims, 7 Drawing Sheets

TOUCH PANEL MODULE

This application claims priority to Chinese Application Serial Number 201410112140.8, filed on Mar. 25, 2014, which is herein incorporated by reference.

BACKGROUND OF THE INVENTION

Field of the Invention

The disclosure relates to touch panel modules, and more particularly to touch panel modules with optimized internal wiring arrangements.

Related Art of the Invention

Touch screens, such as one described in Taiwanese Patent No. 1380071, include components like a liquid crystal module (abbreviated as LCM) and a touch panel module (abbreviated as TPM). The touch panel module usually forms electrical connections with a flexible printed circuit (FPC), and is electrically connected to an external control circuit through the flexible circuit board so as to perform touch signal transmission and relevant control. With respect to the wiring design of conventional touch panel modules and flexible circuit boards, the touch panel module is provided with multiple metal contacts that correspond in number to control electrodes thereof (e.g., ITO electrodes). The metal contacts are to be connected to the touch electrodes in a one-to-one manner via metal conducting wires. The flexible circuit board is also provided with metal contacts that correspond in number. When the metal contacts of the flexible circuit board are connected to the metal contacts of the touch panel module, control signal transmission and control procedures may be performed.

However, among many deficiencies of these configurations, based on the metal contact and relevant wiring arrangement of current touch screens, each touch electrode needs to be provided with a set of dedicated conducting wire and metal contact so as to transmit the touch signal out through conduction. However, this design will lead to the conducting wires and the metal contacts occupying too much surface area, which impedes the minimization of the size of the touch panel module and the flexible circuit board, and also limits adjustment flexibility of wiring arrangement.

SUMMARY OF THE INVENTION

Therefore, an object of the disclosure is to provide a touch panel module that can effectively enhance wiring configuration flexibility and facilitate size reduction.

Accordingly, a touch panel module includes a substrate, a first sensing unit, at least one second sensing unit, an attaching portion and a connecting portion. The substrate is light transmissive, and is divided into a viewing area and a non-viewing area adjacent to the viewing area. The first sensing unit is light transmissive, is disposed on the viewing area of the substrate, and includes at least one first electrode capable of generating a touch sensing signal. The at least one second sensing unit is disposed to correspond in position to the non-viewing area of the substrate, and includes at least one first sub-electrode capable of generating a touch sensing signal. The attaching portion is disposed to correspond in position to the non-viewing area of the substrate, and includes at least one first contact, and at least one first conducting wire, two ends of which are respectively connected to the first electrode and the first contact, thereby forming an electrical connection between the first electrode and the first contact. The connecting portion is disposed to correspond in position to the non-viewing area of the substrate, and includes at least one first conducting sub-wire. The first conducting sub-wire is for forming an electrical connection between the first electrode and the first sub-electrode.

An effect of this disclosure lies in that, through different arrangements of the attaching portion and the connecting portion, the touch panel module can provide more flexible wiring arrangements for transmission of touch sensing signals from the first sensing unit and the second sensing unit, and can effectively reduce the area of the conductor structure, thereby facilitating at least size reduction of the touch panel module.

BRIEF DESCRIPTION OF THE DRAWINGS

Other features and advantages of the disclosure will become apparent in the following detailed description of the exemplary embodiments with reference to the accompanying drawings, of which.

DETAILED DESCRIPTION OF THE DISCLOSURES

Figure 1:
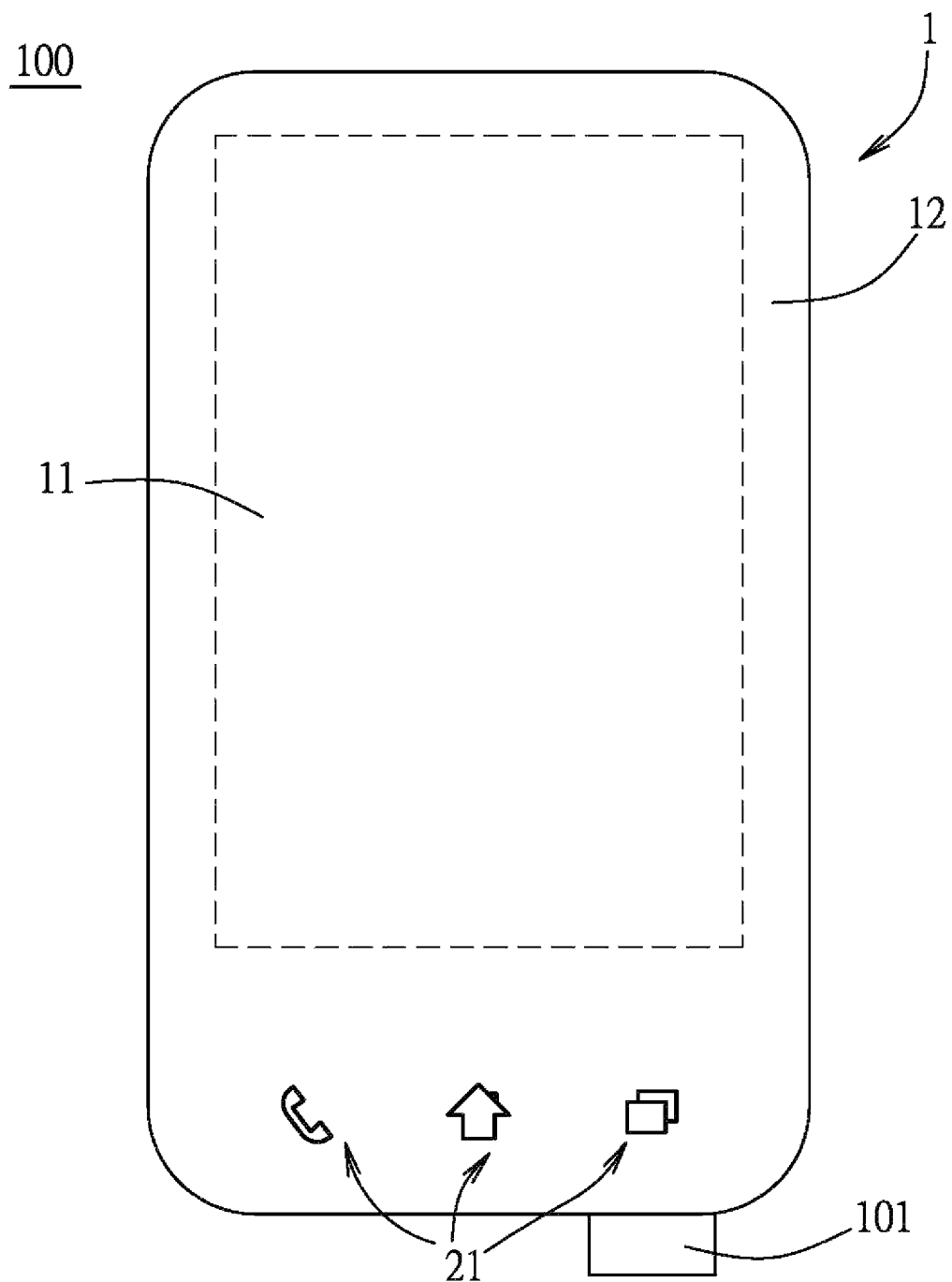
FIG. 1 is a schematic diagram, illustrating a front view of a touch panel module of an embodiment of this disclosure.

Before the disclosure is described in greater detail, it should be noted that like elements are denoted by the same reference numerals throughout the disclosure.

Figure 2:
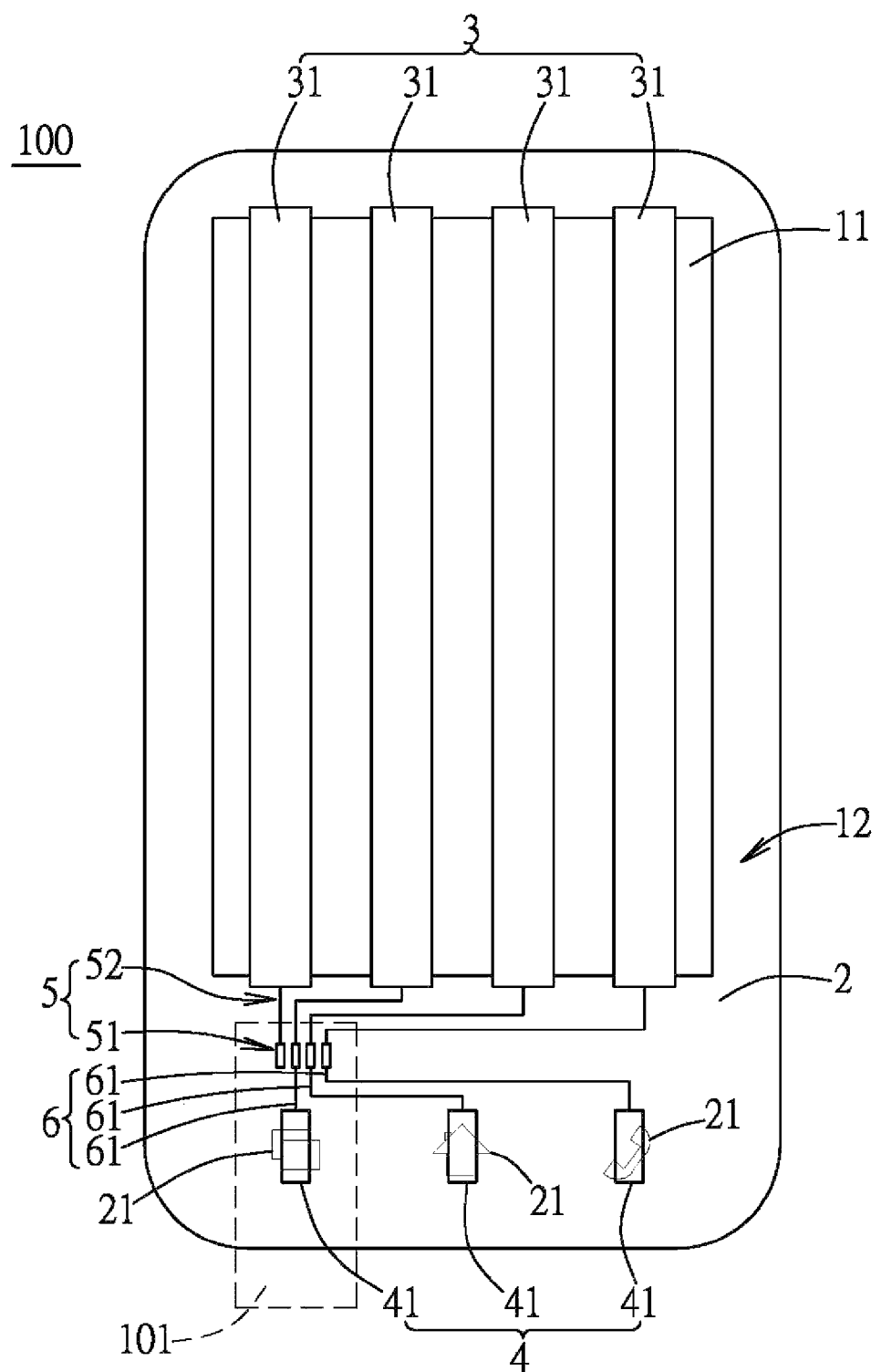
FIG. 2 is a schematic diagram, illustrating a back view of a touch panel module of a first embodiment of this disclosure.

With reference to FIG. 1 and FIG. 2, a touch panel module 100 is illustrated. The touch panel module 100 is applicable to various electronic devices, such as a mobile phone, a tablet computer, or the like, and is not limited to any particular application.

The touch panel module 100 includes a substrate 1, a cover layer 2, a first sensing unit 3, at least one second sensing unit 4 (three are shown in FIG. 2, without limitation thereto), an attaching portion 5 and a connecting portion 6, and forms an electrical connection with an external circuit (not shown) through a flexible circuit board 101.

The substrate 1 is light transmissive, is divided into a viewing area 11 and a non-viewing area 12 adjacent to the viewing area 11, and can be made of glass, etc., but is not limited thereto.

The cover layer 2 is disposed on the non-viewing area 12 of the substrate 1, can be manufactured by light-shielding materials, such as cell phone exterior paint, dark ink or dark photoresist. Components, such as the second sensing units 4, the attaching portion 5, the connecting portion 6, the flexible circuit board 101, are disposed on the cover layer 2, so as to provide an outer appearance modifying function where these components are shielded. In some embodiments, the cover layer 2 is formed with at least one hollow pattern portion 21 (three as an example here). Locations of the hollow pattern portions 21 respectively correspond to the second sensing units 4 to provide the user with touch identifying functionality with regard to the locations of the second sensing units 4. In some embodiments, the cover layer 2 is omitted from the non-viewing area 12 of the substrate 1, and a structure, such as a housing, an outer frame, etc., is directly used to shield the non-viewing area 12, in which case the second sensing units 4, the attaching portion 5, the connecting portion 6 and the flexible circuit board 101 are directly disposed on the substrate 1. Therefore, the cover layer 2 is not restricted to a specific type.

The first sensing unit 3 is mainly disposed on the viewing area 11 of the substrate 1, and includes at least one first electrode 31 (four herein, without limitation to this number) that can generate a touch sensing signal. The first electrodes 31 are made of, in at least one embodiment, transparent conductive materials, such as indium tin oxide (ITO), and extend in a first direction (longitudinal direction on the drawings here), and are spaced apart from each other in a second direction (horizontal direction on the drawings here). The specific shape and design of the electrodes is defined based on the requirements, and is illustrated to be an elongated shape in the schematics herein.

Placements of the second sensing units 4 correspond to the non-viewing area 12 of the substrate 1. In some embodiments, the second sensing units 4 are disposed on the cover layer 2 and located corresponding to the hollow pattern portions 21. The second sensing units 4 each include at least one first sub-electrode 41 (three for example herein, without limitation thereto) that generate the touch sensing signal. Herein, the first sub-electrodes 41 extend in the first direction for the user to touch locations of the front side (see FIG. 1) of the substrate 1 that has the hollow pattern portions 21 to generate a corresponding touch signal. Similar to the first electrodes 31, the first sub-electrodes 41 can be made from transparent conductive materials, such as indium tin oxide, but material, shape and number thereof are not limited to any particular type.

The attaching portion 5 is a conductive structure for conducting the touch sensing signals generated by the first sensing unit 3 and the second sensing units 4 to the flexible circuit board 101 with a location thereof corresponding to the non-viewing area 12 of the substrate 1, and includes at least one first contact 51 and at least one first conducting wire 52. In some embodiments, the number of the first contact 51 corresponds to that of the first electrode 31 (e.g., four). The first contacts 51 are spaced apart from each other and arranged on the cover layer 2 for forming electrical connections with electrode contacts (not shown) of the flexible circuit board 101. Moreover, in some embodiments, the number of the first conducting wires 52 is four, and they are disposed on the cover layer 2, with two ends of each respectively connected to a corresponding one of the first electrodes 31 and a corresponding one of the first contacts 51, making the corresponding one of the first electrodes 31 electrically connected to the corresponding one of the first contacts 51, and the first contacts 51 transmit the touch sensing signals generated by the first electrodes 31 to the outside.

The connecting portion 6 is a conducting structure for transmitting the touch sensing signals generated by the first sub-electrodes 41 of the second sensing unit 4 to the outside, and its location corresponds to the non-viewing area 12 of the substrate 1, and includes at least one first conducting sub-wires 61 (three herein, without limitation thereto). The first conducting sub-wires 61 are for forming electrical connections between the first electrodes 31 and the first sub-electrodes 41. Specifically speaking, one end of each first conducting sub-wire 61 is connected to a corresponding first contact 51 and another end to a corresponding first sub-electrode 41. As such, the first electrodes 31 of the first sensing unit 3 and the first sub-electrodes 41 of the second sensing unit 4 are able to share a portion of the first contacts 51, so that there is no need to provide a first contact 31 for each individual first sub-electrode 41 and each individual first contact 31. This configuration not only reduces the occupied area of the first contacts 51, but also enhances the circuit configuration flexibility of the touch panel module 100, while also reducing the number of electrode contacts on the flexible circuit board 101, facilitating the reduction of the width of the flexible circuit board 101, and thereby being beneficial to the size reduction of the touch panel module 100 and the flexible circuit board 101.

It should be noted herein that in some embodiments, the attaching portion 5 and the connecting portion 6 are both disposed between the first sensing unit 3 and the second sensing unit 4. In some embodiments, based on practical circumstances, the wiring configuring location and number of the attaching portion 5 and the connecting portion 6 can all be adjusted according to needs, and are not limited to what is disclosed herein.

Figure 3:
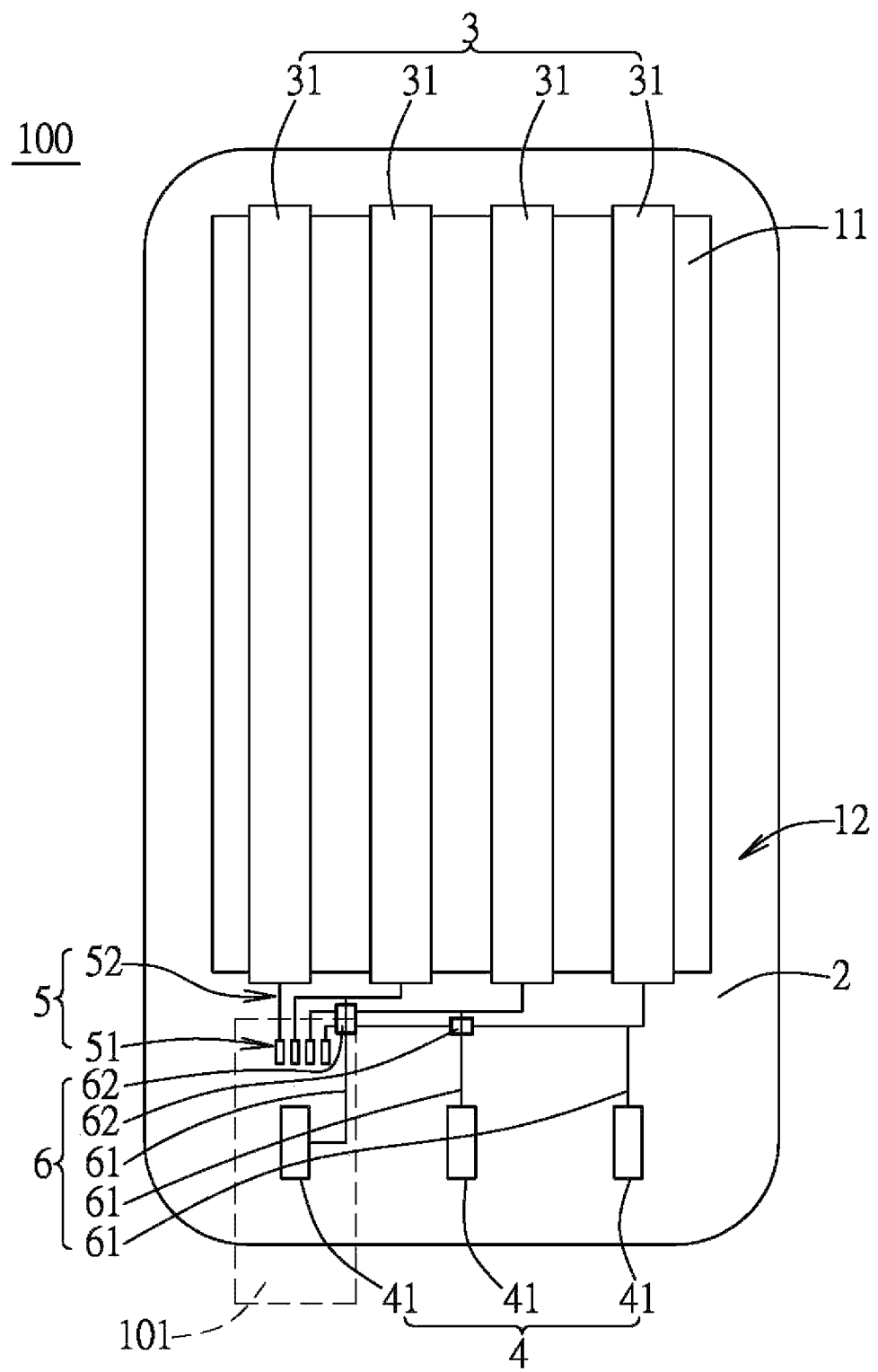
FIG. 3 is a schematic diagram, illustrating a touch panel module of a second embodiment of this disclosure.

With reference to FIG. 3, further embodiments of a touch panel module 100 of this disclosure are illustrated. The touch panel module 100 is substantially the same as that shown in FIGS. 1 and 2, the main difference being in the connecting portion 6.

In some embodiments, the connecting portion 6 further includes at least one first insulating layer 62 (two as an example herein, but not limited thereto), and the circuit layout of the first conducting wires 52 and the first conducting sub-wires 61 are not entirely identical to that shown in FIG. 2. In detail, the first conducting wires 52 extend between the first electrodes 31 and the first sub-electrodes 41, and the first conducting sub-wires 61 cross the first conducting wires 52 in an electrically insulating manner so as to electrically connect the first conducting wires 52 to which they belong. The first insulating layers 62 are respectively disposed on overlapping parts of the first conducting wires 52 and the first conducting sub-wires 61, and respectively clamped between the first conducting wires 52 and the first conducting sub-wires 61 so as to provide electrical insulating effect.

One end of each first conducting sub-wire 61 is connected to the corresponding first sub-electrode 41, and a portion of the first conducting sub-wires 61 can achieve the circuit connection objective by having the first insulating layers 62 cross a portion of the first conducting wires 52 in an electrically insulating manner and having another end thereof connected to the corresponding first conducting wire 52. A wiring configuration that is different from that shown in FIG. 2 is provided, and the touch panel module 100 and the flexible circuit board 101 do not need an increased number of first contacts 51 and electrode contacts, thereby being beneficial in reducing the overall size of the device.

It should be noted herein that after the first conducting sub-wires 61 cross a portion of the first conducting wires 52 in an electrically insulating manner, they can be directly connected to the corresponding first electrodes 31 and not connected to the first conducting wires 52. Therefore, no specific connecting configuration is required herein. The first sensing unit 3 and the second sensing unit 4 are each a single-axis sensing electrode structure, which can be adapted for use on some simple touch electronic devices, but the disclosure is not limited in this respect.

Figure 4:
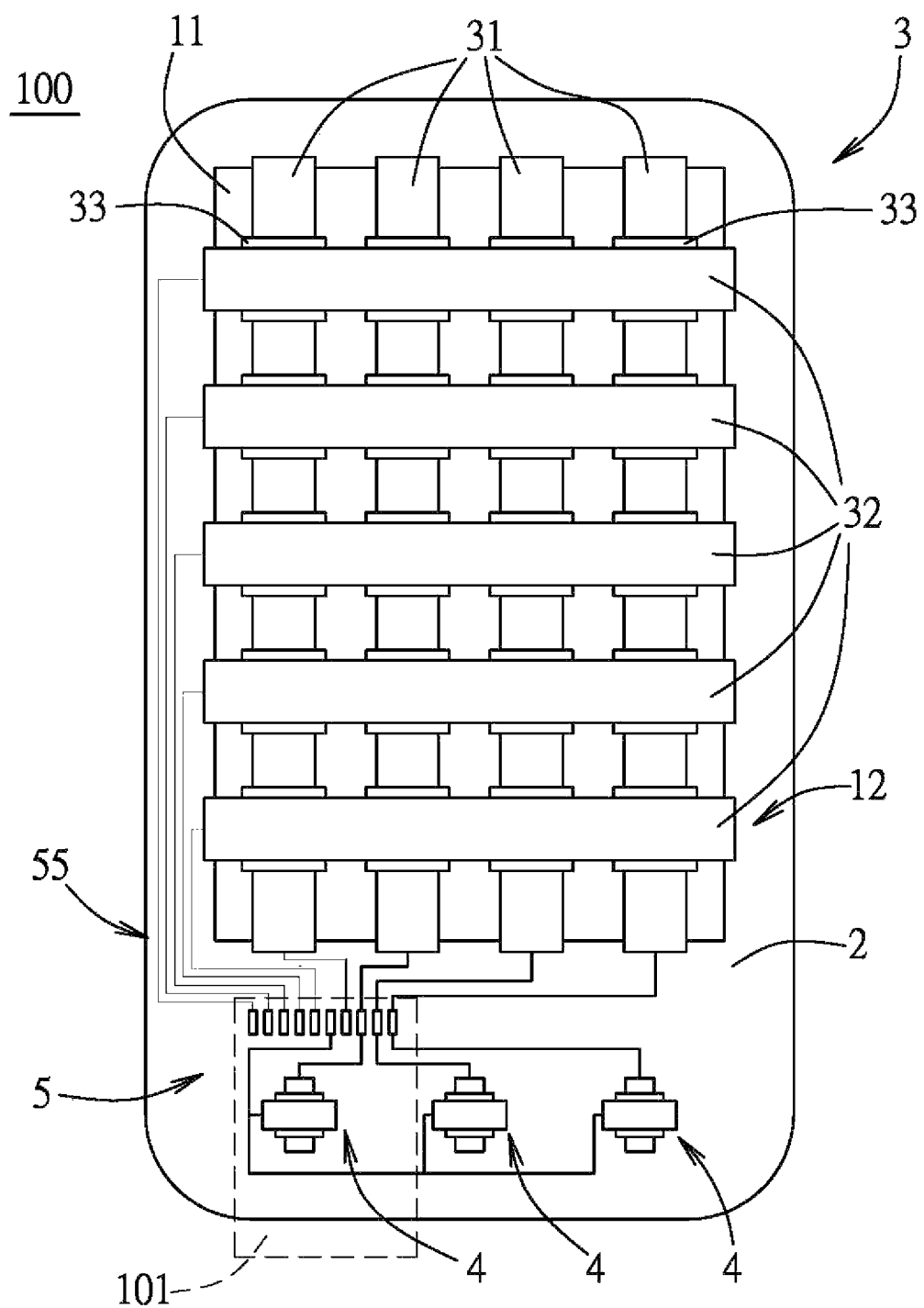
FIG. 4 is a schematic diagram, illustrating a touch panel module of a third embodiment of this disclosure.
Figure 5:
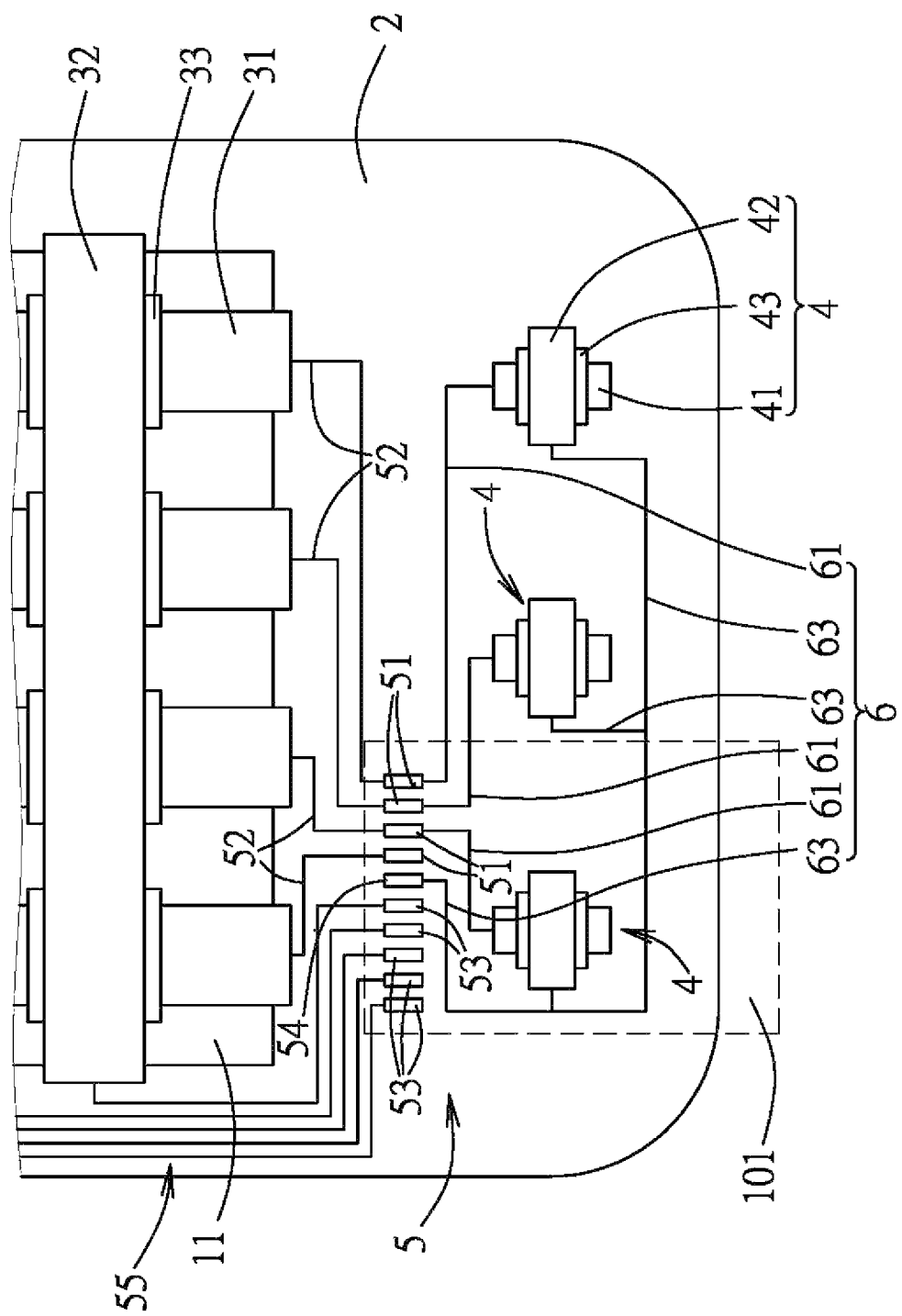
FIG. 5 is a partial enlarged view of FIG. 4.

With reference to FIG. 4 and FIG. 5, a touch panel module 100 according to this disclosure is illustrated. The touch panel module 100 is substantially identical to that of FIG. 2, the main difference being in the sensing electrode structures of the first sensing unit 3 and the second sensing unit 4.

In some embodiments, the first sensing unit 3 and the second sensing unit 4 are each a dual axis sensing electrode structure. Accordingly, the first sensing unit 3 further includes at least one second electrode 32 (for example, five here, but not limited thereto) and a second insulating layer 33, and the second sensing units 4 each further include at least one second sub-electrode 42 (for example, three here, but not limited thereto) and a third insulating layer 43. As such, the attaching portion 5 and the connecting portion 6 that provide conducting wiring functionality all have configurations different from the first embodiment.

Specifically speaking, the second electrodes 32 of the first sensing unit 3 extend along the second direction (horizontal direction in the drawings) and are arranged to be spaced apart from each other in the first direction (longitudinal direction in the drawings), cross the first electrodes 31, and can generate touch sensing signals in a different orientation from the first electrodes 31 and remain mutually insulating therewith by virtue of the second insulating layer 33 clamped therebetween. The second electrodes 32 can be made from transparent conductive materials similar to the first electrodes 31, but the material, electrode shape and number thereof may all be defined based on requirements. Each second sub-electrode 42 of the second sensing unit 4 also extends along the second direction, crosses a respective first sub-electrode 41 and remains insulating therewith by virtue of the third insulating layer 43 clamped therebetween, thereby providing touch sensing signals different in orientation from the first sub-electrodes 41. In some embodiments, the second insulating layer 33 and the third insulating layer 43 are both composed of structures formed by multiple insulating blocks. These insulating blocks are respectively disposed at junctions between the first electrodes 31 and the second electrodes 32 of the first sensing unit 3, and junctions of the first electrodes 41 and the second electrodes 42 of the second sensing unit 4, so as render the two different axis electrodes electrically insulating. In other embodiments of this disclosure, the structures of the second insulating layer 33 and the third insulating layer 43 can be structures that are distributed to entirely cover the first electrodes and the first sub-electrodes. This disclosure is not limited in this respect.

Moreover, other than the first contacts 51 and the first conducting wires 52 that form electrical connections with the first electrodes 31 of the first sensing unit 3, the attaching portion 5 of this embodiment further includes at least one (such as five here) second contact 53, at least one (such as one here) third contact 54 and at least one (such as five here) second conducting wire 55. The second contacts 53 are spaced apart from each other and arranged on the cover layer 2 for forming electrical connections with the electrode contacts (not shown) of the flexible circuit board 101, so as to perform touch sensing signal transmission. Two ends of each second conducting wire 55 respectively connect a corresponding second electrode 32 and corresponding second contact 53, so as to form electrical connections between the second electrodes 32 and the second contacts 53, to thereby transmit the touch sensing signals generated by the second electrodes 32 through the second contacts 53 to the flexible circuit board 101.

On the other hand, the connecting portion 6 of this embodiment further includes at least one (herein, there are three that are mutually connected, but the embodiment is not limited to this arrangement) second conducting sub-wire 63. Two ends of each second conducting sub-wires 63 are respectively connected to a corresponding third contact 54 and a corresponding second sub-electrode 42, thereby forming electrical connections between the third contacts 54 and the second sub-electrodes 42.

As such, in this embodiment, while the first sensing unit 3 and the second sensing unit 4 are both dual sensing electrode structures, since the first electrodes 31 of the first sensing unit 3 and the first sub-electrodes 41 of the second sensing unit 4 still share the first contacts 51, there is no need to provide a first contact 51 for each first electrode 31 and each first sub-electrode 41, thereby effectively reducing the placement arrangement and number of the first contacts 51. Besides, since each second sub-electrodes 42 of the second sensing unit 4 is connected to the same third contact 54 via the second conducting sub-wires 63, there is no need to provide a designated third contact 54 for each second sub-electrode 42. The occupied area of the third contacts 54 is reduced, and the flexibility of circuit arrangement is enhanced.

Figure 6:
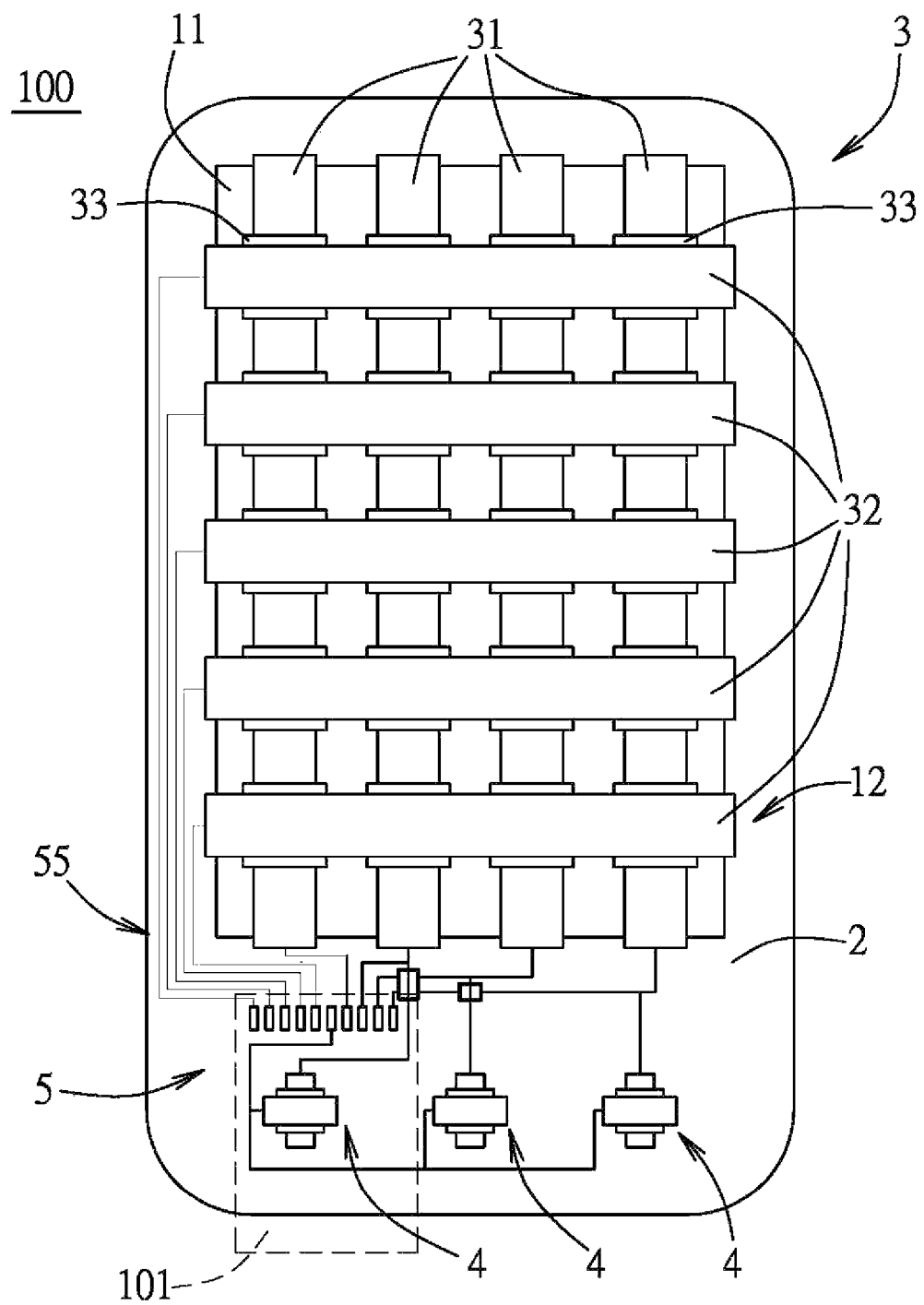
FIG. 6 is a schematic diagram, illustrating a touch panel module of a fourth embodiment of this disclosure.
Figure 7:
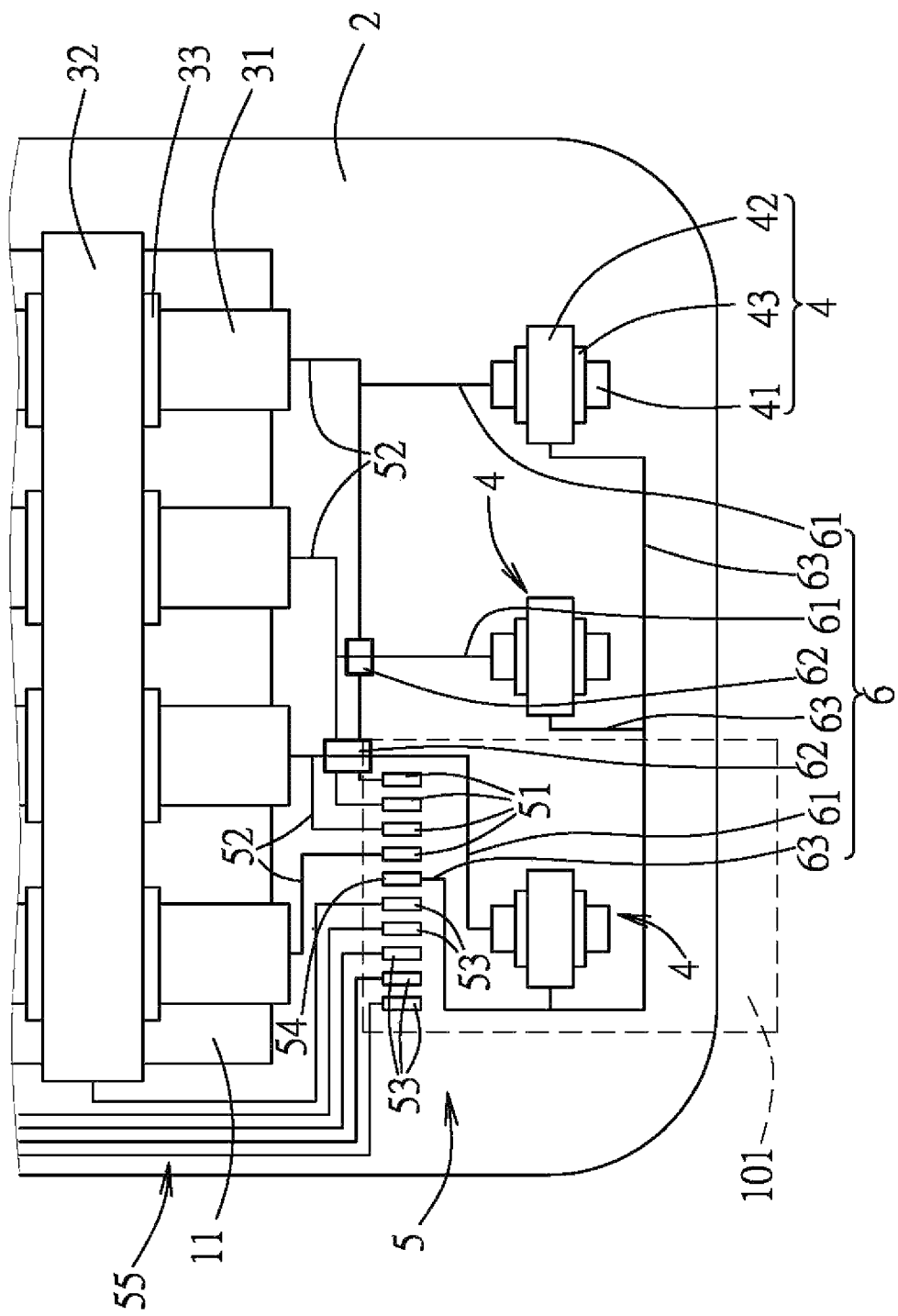
FIG. 7 is a partial enlarged view of FIG. 6.

With reference to FIG. 6 and FIG. 7, the fourth embodiment of a touch panel module 100 of this disclosure is illustrated. In some embodiments, the configurations of the first sensing unit 3 and the second sensing unit 4 are similar to the dual-sensing electrode structure of that shown in FIG. 4. However, the configurations of the attaching portion 5 and the connecting portion 6 are slightly different from those shown in FIG. 4, and are related to FIG. 3.

Specifically speaking, in the preferred applied configuration in some embodiments, the attaching portion 5 and the connecting portion 6 are disposed between the first sensing unit 3 and the second sensing unit 4. An end of each first conducting sub-wire 61 is used to connect to the corresponding first sub-electrode 41, and a portion of the first conducting sub-wires 61 cross over the first conducting wires 52 in an electrically insulating manner through the first insulating layers 62, and are connected to the corresponding first electrodes 31 or first conducting wires 52 via another end thereof so as to complete the wiring connections. In some embodiments, the first conducting sub-wires 61 are arranged to cross over the second conducting wires 55, or cross over both of the first conducting wires 52 and the second conducting wires 55.

As with the second conducting sub-wires 63, the same configuration is maintained as shown in FIG. 4, where two ends of each mutually connected second conducting sub-wires 63 are respectively connected to the corresponding third contact 54 and the corresponding second sub-electrode 42, forming electrical connections between the third contacts 54 and the second sub-electrodes 42. However, in some embodiments, the second conducting sub-wires 63 can be mutually disconnected, or the attaching portion 5 may be provided with multiple third contacts 54 to provide for electrical connections by the second conducting sub-wires 63.

Through various designs of arrangements of the attaching portion 5, and the connecting portion 6, the touch panel modules 100 of this disclosure provide multiple conductive wiring configurations, thereby being able to enhance the flexibility in wiring arrangement. Moreover, based on the embodiments, the provided numbers of electrode contacts on the touch panel module 100 and the flexible circuit board 101 are reduced, thereby facilitating volume reduction of the two. Therefore, the touch panel module 100 of this disclosure indeed achieves the object of this disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch panel module, comprising:
   a substrate that is light transmissive, wherein said substrate is divided into a viewing area and a non-viewing area adjacent to said viewing area;
   a first sensing unit that is light transmissive, wherein:
      said first sensing unit is disposed on said viewing area of said substrate, and
      said first sensing unit consists of a set of first electrodes extending in a same direction and capable of generating a touch sensing signal;
   at least one second sensing unit that is disposed to correspond in position to said non-viewing area of said substrate, wherein said second sensing unit includes at least one first sub-electrode capable of generating a touch sensing signal;
   an attaching portion that is disposed to correspond in position to said non-viewing area of said substrate, wherein said attaching portion includes:
      a set of first contacts, wherein a number of contacts in said set of first contacts is equal to a number of electrodes in said set of first electrodes, and
      at least one first conducting wire, wherein a first end of said first conducting wire is connected to a first electrode of said set of first electrodes and a second end of said first conducting wire is connected to a first contact of said set of first contacts to form an electrical connection between said first electrode of said set of first electrodes and said first contact of said set of first contacts; and
   a connecting portion that is disposed to correspond in position to said non-viewing area of said substrate, wherein:
      said connecting portion includes at least one first conducting sub-wire, and
      said first conducting sub-wire forms an electrical connection between said first electrode of said set of first electrodes and said first sub-electrode.

2. The touch panel module of claim 1, wherein a first end of said first conducting sub-wire is connected to said first contact of said set of first contacts and a second end of said first conducting sub-wire is connected to said first sub-electrode.

3. The touch panel module of claim 1, wherein:
   said first conducting wire extends between said first electrode of said set of first electrodes and said first sub-electrode,
   said first conducting sub-wire crosses over said first conducting wire in an electrically insulating manner, and
   a first end of said first conducting sub-wire is connected to said first electrode of said set of first electrodes and a second end of said first conducting sub-wire is connected to said first sub-electrode.

4. The touch panel module of claim 3, wherein:
   said connecting portion further includes at least one first insulating layer,
   said first insulating layer is disposed at an overlapping location of said first conducting wire and said first conducting sub-wire, and
   said first insulating layer is clamped between said first conducting wire and said first conducting sub-wire.

5. The touch panel module of claim 1, wherein no electrodes are disposed on said viewing area of said substrate other than said set of first electrodes.

6. The touch panel module of claim 1, wherein:
   said connecting portion further includes a plurality of first insulating layers,
   said attaching portion includes a plurality of first conducting wires,
   said first insulating layers are respectively disposed at overlapping locations of said first conducting wires and said first conducting sub-wire, and
   said first insulating layers are respectively clamped between said first conducting wires and said first conducting sub-wire.

7. The touch panel module of claim 1, further comprising a cover layer that is light shielding, wherein:
   said cover layer is disposed on said non-viewing area of said substrate, and
   said second sensing unit, said attaching portion and said connecting portion are disposed thereon.

8. The touch panel module of claim 7, wherein:
   said cover layer is formed with at least one hollow pattern portion, and
   said hollow pattern portion corresponds in location to said second sensing unit.

9. The touch panel module of claim 1, wherein said first electrode of said set of first electrodes is rectangular-shaped.

10. The touch panel module of claim 1, wherein:
    said second sensing unit consists a set of first sub-electrodes extending in said same direction, and
    a number of said first sub-electrodes in said set of first sub-electrodes is less than said number of electrodes in said set of first electrodes.

11. The touch panel module of claim 1, wherein said first electrode of said set of first electrodes and said first sub-electrode extend along said same direction.

12. The touch panel module of claim 1, further comprising a flexible circuit board that is disposed to correspond in position to said set of first contacts.

13. A touch panel module, comprising:
    a substrate that is light transmissive, wherein said substrate is divided into a viewing area and a non-viewing area adjacent to said viewing area;
    a first sensing unit that is light transmissive, wherein:
       said first sensing unit is disposed on said viewing area of said substrate, and
       said first sensing unit includes at least one first electrode capable of generating a touch sensing signal;
    at least one second sensing unit that is disposed to correspond in position to said non-viewing area of said substrate, wherein:
       said second sensing unit includes at least one first sub-electrode capable of generating a touch sensing signal and a plurality of second sub-electrodes capable of generating a touch sensing signal, and
       said first sub-electrode extends in a first direction and said second sub-electrodes extend in a second direction different than said first direction;
    an attaching portion that is disposed to correspond in position to said non-viewing area of said substrate, wherein said attaching portion includes:
       at least one first contact,
       at least one second contact, and
       at least one first conducting wire, wherein a first end of said first conducting wire is connected to said first electrode and a second end of said first conducting wire is connected to said first contact to form an electrical connection between said first electrode and said first contact; and a connecting portion that is disposed to correspond in position to said non-viewing area of said substrate, wherein:
said connecting portion includes at least one first conducting sub-wire and a second conducting sub-wire,
said first conducting sub-wire forms an electrical connection between said first electrode and said first sub-electrode, and
said second conducting sub-wire has a first end connected to said second contact, a second end connected to a first instance of said second sub-electrodes, and a third end connected to a second instance of said second sub-electrodes to form an electrical connection between said second contact and said first instance of said second sub-electrodes and said second instance of said second sub-electrodes.

14. The touch panel module of claim 13, wherein:
said first electrode of said first sensing unit extends along a first direction,
said first sensing unit further includes at least one second electrode that extends along a second direction and that is capable of generating a touch sensing signal, and
said second electrode and said first electrode cross each other and are mutually electrically insulating.

15. The touch panel module of claim 14, wherein said second sub-electrode and said first sub-electrode cross each other and are mutually electrically insulating.

16. The touch panel module of claim 15, wherein:
said attaching portion further includes at least one third contact and at least one second conducting wire,
said second conducting wire has a first end connected to said second electrode and a second end connected to said third contact to form an electrical connection between said second electrode and said third contact.

17. The touch panel module of claim 13, wherein:
said first conducting sub-wire crosses over said first conducting wire in an electrically insulating manner, and
a first end of said first conducting sub-wire connected to said first electrode and a second end of said first conducting sub-wire connected to said first sub-electrode.

18. The touch panel module of claim 17, wherein:
said connecting portion further includes at least one first insulating layer,
said first insulating layer is disposed at an overlapping location of said first conducting wire and said first conducting sub-wire, and
said first insulating layer is clamped between said first conducting wire and said first conducting sub-wire.

19. The touch panel module of claim 13, wherein said first conducting sub-wire is connected to said first conducting wire.

20. The touch panel module of claim 13, wherein said second conducting sub-wire has a fourth end connected to a third instance of said second sub-electrodes.

* * * * *